2,786,826

CATIONIC UREA-FORMALDEHYDE RESINS AND PREPARATION THEREOF

Gerald I. Keim, Oxford, Pa., assignor to Hercules Powder Company, Wilmington, Del., a corporation of Delaware No Drawing. Application August 21, 1953, Serial No. 375,826

11 Claims. (Cl. 260—70)

This invention relates in general to a cationic urea-formaldehyde resin and a process for producing the resin.

An ever important problem in the manufacture of paper has been the preparation of a wet strength paper whereby the paper is resistant to tearing or breaking even when wet. This property of increased strength and particularly wet strength has been imparted to the paper through the incorporation in a paper furnish of a urea-formaldehyde resin, but previously the incorporation of such a resin in the paper furnish has been accomplished by precipitating the resin or by utilizing a resin which has been partly polymerized and which is characterized by being in the gel state or nearly in the gel state with the result that the urea-formaldehyde resin is mechanically entrained on the paper fibers.

More recently, high wet strength and dry strength paper products have been prepared by the addition thereto of a partially polymerized hydrophilic cationic urea-formaldehyde resin which contains as a modifier a water-soluble polyfunctional organic nitrogen base. A description of these resins is contained in U. S. Patent No. 2,554,475 to Tzeng-Jiueq Suen et al.; Canadian Patent No. 467,505 to John H. Daniel, Jr., et al.; in my Canadian Patent No. 468,512; and in my copending application Serial No. 341,889 filed March 12, 1953. These modified resins are substantive to the paper fibers, i. e., they are characterized by substantial exhaustion onto the paper fibers and even distribution thereon without the need of addition of a precipitating or fixing agent. The use of such resins leads to a process for preparing a paper of extraordinarily high wet strength by a practicable process easily adaptable to existing paper machinery.

In making cationic modified urea-formaldehyde resins, thiourea or a mixture of urea and thiourea may be used in place of urea, while any methylene-yielding substance, such as paraformaldehyde or hexamethylenetetramine, may be substituted for formaldehyde. The ratio of methylene-yielding substance to urea, thiourea, or mixture thereof is not critical. When formaldehyde is used, the preferred ratio is from 1.8 to 2.8 moles of formaldehyde per mole of urea, thiourea, or mixture thereof. Hereafter the invention will be discussed in terms of urea and formaldehyde as the primary reactants but it is understood that any methylene-producing substance, as stated above, may be used in place of formaldehyde and that either thiourea or mixtures of thiourea with urea may be used in place of urea.

The water-soluble polyfunctional organic nitrogen bases used to modify the urea-formaldehyde resins are alkylenepolyamines of the formula $H_2N(C_nH_{2n}HN)_xH$ in which $n$ is 2 or more and $x$ is one or more, such as ethylenediamine and 1,3-propylenediamine and polyalkylenepolyamines such as diethylenetriamine, triethylenetetramine, tetraethylenepentamine; the corresponding polypropylenepolyamines and polybutylenepolyamines; also guanidines, biguanides, the guanylureas and the salts thereof; condensation products of alkylenepolyamines, such as the above with halohydrins such as α-dichlorhydrin, epichlorhydrin and the like; monoalkylolamines, dialkylolamines, trialkylolamines, and the like; and the water-soluble condensation products thereof with aldehydes such as formaldehyde. The amount of water-soluble polyfunctional organic nitrogen base used may vary widely. Generally, from about 3% to about 44% of the polyfunctional base based on the weight of the urea is preferred. The polyalkylenepolyamines are the preferred polyfunctional bases for the purpose of this invention.

It is preferred to heat all the ingredients together for a short period of time under alkaline conditions and then for a relatively long period of time under acid conditions until a resin sirup of the desired viscosity is formed. If desired, the alkaline reaction can be omitted and the entire reaction carried out under acid conditions. An alternative procedure for making the resins involves reacting urea and formaldehyde under alkaline conditions followed by addition of the water-soluble polyfunctional organic nitrogen base and reaction under acid conditions until a resin having the desired viscosity is achieved. In general, as set forth in the art, cationic, modified urea-formaldehyde resins suitable for use as wet strength resins should have a viscosity of at least about D on the Gardner-Holdt scale when measured at 20° C. on an aqueous solution having 45% solids by weight.

These resins, while representing a great advance over the prior art in flexibility of use on the paper machine and in the quality of the product produced, nevertheless suffer a very serious drawback in that all are characterized by the fact that not more than about 50% of the resin is retained by the paper when the resin is added to the water suspension of paper stock, i. e., at any point of the papermaking machine ahead of the wire or screen. This is clearly shown by Fig. 1 of Canadian 467,505. As this is the principal method used commercially to incorporate these resins in paper, this is a serious drawback. Recirculating the white water has not proved a satisfactory answer. Thus, it is necessary to run part of the white water to the sewer in order to prevent the accumulation of dissolved substances in the paper mill systems. These substances, if allowed to accumulate indefinitely, tend to cause trouble with foaming, slime growth, poor sizing and sticking on the press rolls. In addition, it has been found that recirculation of the white water does not result in any saving of urea-formaldehyde resin as would be expected from the amounts of resin present in the white water.

Now in accordance with the present invention there has been discovered a cationic modified urea-formaldehyde resin which is substantially completely retained by the paper when added to a water suspension of paper fiber and a process for producing this resin. It is possible by using the resins of the instant invention to obtain the same wet strength as obtained with the prior art cationic urea-formaldehyde resins with the use of only about one-half the amount of the instant resins as was necessary with the prior art resins. Conversely, it is possible to obtain approximately a 30% increase in wet strength by using the same amount of the instant resin to treat paper as of the prior art resin.

These highly efficient cationic urea-formaldehyde resins are prepared by treating an aqueous solution of a cationic urea-formaldehyde resin modified by a water-soluble polyfunctional organic nitrogen base, which resin has been produced by any of the methods set forth above, with an appropriate cation, namely, an alkali metal or ammonium ion. The cation is added in the form of an alkali metal or ammonium salt whose 1 N solution has a pH of less than about 8. As a result of this treatment a fraction of the original resin is precipitated. This precipitate may be separated by any of the processes known to those skilled in the art, such as filtering, centrifuging, or allowing the precipitate to settle and then either decanting the supernatant liquid or draining off the lower layer. The resin so separated has been found to be substantially completely retained on the paper fibers when used in the so-called beater addition process. The yield of precipitate may be varied from about 20% to about 60% of the starting resin solids by varying the temperature, the cation, the concentration of the cation, and the dilution and nature of the starting cationic resin.

The filtrate which contains the unprecipitated resin may be treated to produce further amounts of cationic urea-formaldehyde resin which may then be treated in accordance with this invention. Thus, the filtrate may be concentrated to about 40% to about 50% solids with about 43% to about 45% solids preferred, and the ratio of urea to formaldehyde adjusted to the desired value. This solution may then be polymerized in a manner similar to that used in preparing the original resin either with or without adding a fresh charge of urea, formaldehyde, and water-soluble polyfunctional organic nitrogen base modifier to the concentrated filtrate.

An alternative method of recovering the resin values in the filtrate, while avoiding the evaporation of water, is to add to the filtrate a concentrated form of formaldehyde, such as paraformaldehyde, dimethylolurea or a concentrated solution of formaldehyde which has been stabilized with urea (such a solution is marketed by the E. I. du Pont de Nemours & Company under the trade name of "Arboneeld B"). Sufficient urea is added along with the formaldehyde to maintain the desired urea to formaldehyde ratio. By this means the solution is adjusted to about 40% to about 50% solids, with from about 43% to about 45% solids preferred. Additional amounts of the water-soluble polyfunctional organic nitrogen base modifier are added and the solution is polymerized in a manner similar to that used in preparing the original resin.

It has been found that the resins obtained by reworking the unprecipitated fractions produced in the process of the instant invention give approximately the same proportion of precipitated resin when processed in the instant process as do those resins which do not contain any reworked fractions. Thus, substantially none of the cationic modified urea-formaldehyde resin is lost either in producing the more highly efficient resins of the instant invention or in the papermaking process wherein the resin is used to produce a paper of exceptionally high wet strength.

The resins treated in accordance with the process of the instant invention are themselves cationic. Moreover, the cations used in the process of the instant invention, namely, ammonium ion and the alkali metal ions, generally give water-soluble salts. That these cations should nevertheless be efficient in forming an insoluble precipitate from a cationic resin is highly unusual and is not understood. The action does not seem to be due to any salting out effect for as little as two parts of salt added to 100 parts of a cationic resin solution having 30% solids, to which are added an additional 300 parts of water, will precipitate out 30 parts of highly substantive urea-formaldehyde resin dispersion having about 30% solids. Similarly, neither is the nature of the resin produced by the process of the instant invention fully known. However, it is known that the resin has the highly unusual property of being substantially completely retained by the paper fibers.

The general nature and form of the invention having been set forth and described the following examples are presented in illustration but not in limitation of the invention. All parts and percentages are by weight unless otherwise specified. Where no temperature is specified, room temperature was used.

*Examples 1 through 11*

A solution was prepared containing 864 parts of urea and 2,608 parts of 37% formaldehyde which was methanol-free. To this was added 116.8 parts of triethylenetetramine. The solution was refluxed for 5 minutes and then 80 parts of 90% formic acid were added. The solution was again heated to reflux (about 102° C.) and maintained at this temperature until the viscosity, as determined on a 44% aqueous solution, had risen to U–V on the Gardner-Holdt scale. The solution was then cooled and neutralized with sodium hydroxide to stop further polymerization and diluted to 30% solids. A series of solutions were then prepared containing 100 parts of the resin solution and 300 parts of water containing designated amounts of salts of the type shown in the following table. The solutions were stirred and then cooled at the temperature set forth in the table. A precipitate formed, was allowed to settle, and the supernatant liquid decanted. The weight of the resin dispersion (i. e., the fraction containing the precipitate) so obtained was then determined. These dispersions in each case contained about 30% solids. The following table sets forth the results:

| Example | Salt | Amount of Salt, parts | Temperature, degrees | Weight of Resin Dispersion (30% solids) |
|---|---|---|---|---|
| 1 | Ammonium acetate | 20 | 10 | 46 |
| 2 | do | 30 | 10 | 54 |
| 3 | Lithium chloride | 20 | 10 | 36 |
| 4 | Sodium chloride | 1 | 10 | 0 |
| 5 | do | 2 | 10 | 30 |
| 6 | do | 6 | 10 | 45 |
| 7 | do | 8 | 10 | 35 |
| 8 | do | 10 | 20 | 25 |
| 9 | do | 30 | 20 | 24 |
| 10 | Sodium nitrate | 10 | 10 | 40.5 |
| 11 | Potassium chloride | 10 | 10 | 37 |

It was found that only half the amount of the resins prepared by precipitation with $NH_4C_2H_3O_2$, LiCl, NaCl, $NaNO_3$ and KCl than of the original untreated resin was needed to produce the same high wet strength in paper when the resins were evaluated as beater additives in a bleached sulfite pulp.

*Examples 12 and 13*

A triethylenetetramine-modified urea-formaldehyde resin was prepared as set forth in Examples 1 through 11. One hundred parts of this resin solution were then mixed with 300 parts of water containing 10 parts of sodium chloride. The mixture was stirred and was then cooled to 10° C. A precipitate settled out and the upper layer decanted off to give a lower layer which constituted 40 parts. This was then dispersed in 360 parts of additional water and the resulting solution was found to contain 2.7% solids.

A bleached sulfite pulp was beaten to a Schopper-Riegler freeness of 750 cc. The slush stock was adjusted to a pH of 4.5 by the addition of papermaker's alum, and then 3% by weight of the resin (solids basis), based on the bone dry weight of the pulp, was added. Handsheets with a basis weight of 40 lb. per ream were formed from the treated pulp. Control sheets were formed by the identical process using an untreated triethylenetetramine-modified urea-formaldehyde resin. The sheets were soaked in distilled water for two hours and then tested for wet tensile strength. The results are set forth in the following table:

| Example | Type of Resin | Wet Tensile Strength of Uncured Sheet, lb./in. | Wet Tensile Strength of Sheet Cured 1 hour at 105° C. Before Soaking, lb./in. |
|---|---|---|---|
| 12 | Triethylenetetramine-modified urea-formaldehyde. | 5.6 | 7.7 |
| 13 | Sodium chloride-treated triethylenetetramine-modified urea-formaldehyde. | 8.0 | 10.2 |

The quantity of highly efficient cationic modified urea-formaldehyde resin obtained in accordance with the instant invention may be increased by (1) diluting the resin solution to a lower solids content, such as 10% solids; (2) cooling the resin solution; or (3) to some extent, increasing the quantity of salt.

The amount of salt used is not critical as can be seen from the examples set forth above. In general, the minimum amount of salt which should be used is that amount which will cause a substantial amount of the resin solids to precipitate, while the maximum amount is limited either by the solubility of the salt or by the amount which will interfere with reworking the filtrate. For most purposes, the amount of salt may vary from about 3% to about 100% by weight, based on the weight of the dry resin solids. It is understood, of course, that the exact amount which should be used will vary with the nature of the resin, the nature of the salt, the concentration of the resin and the temperature at which fractionation is carried out. The optimum conditions of concentration of salt and resin will, in any instance, be varied to suit commercial convenience.

The temperature may vary anywhere from the freezing point of the resin solution to about 80° C. For commercial convenience it is generally preferred to use a temperature between about 5° C. and room temperature, that is, up to about 35° C.

The concentration of the resin solution which is to be fractionated likewise may vary widely. In general, any concentration between the maximum solubility of the resin and the maximum amount of water which it would be economical to handle may be used. Generally, it is preferred to use a concentration between that at which the resin is produced (about 45% solids, by weight) and about 1% solids, by weight.

The highly efficient wet strength resins of the present invention may be used as such to prepare paper having high wet strength or they may be blended with any of the prior art cationic wet strength resins to produce a product of improved efficiency.

As stated before, any water-soluble alkali metal or ammonium salt whose 1 N solution has a pH of less than about 8 may be used to produce the resins of the instant invention. By reason of commercial availability and cheapness, however, it is preferred to use ammonium chloride, ammonium nitrate, sodium chloride, sodium nitrate, sodium phosphate, potassium chloride or potassium nitrate.

I claim:

1. A process for treating a hydrophilic cationic urea-formaldehyde-polyfunctional organic nitrogen base resin to form a resin of improved properties in producing wet strength paper which consists in forming an aqueous solution of such a urea-formaldehyde resin in which the amount of polyfunctional organic nitrogen base is from about 3% to about 44% of the weight of the urea, said resin containing a fraction precipitatable therefrom in said aqueous solution by the addition thereto of a salt selected from the group consisting of alkali metal and ammonium salts whose 1 N aqueous solutions have a pH of less than about 8, adding to the solution a salt of the indicated type to thereby cause said fraction to precipitate, and separating the resulting precipitate.

2. A process according to claim 1 wherein the salt is an ammonium salt.

3. The process according to claim 1 wherein the salt is a sodium salt.

4. The process according to claim 1 wherein the polyfunctional organic nitrogen base is an alkylenepolyamine.

5. The process according to claim 4 wherein the alkylenepolyamine is ethylenediamine.

6. The process according to claim 1 wherein the polyfunctional organic nitrogen base is a polyalkylenepolyamine.

7. The process according to claim 6 wherein the polyalkylenepolyamine is diethylenetriamine.

8. The process according to claim 6 wherein the polyalkylenepolyamine is triethylenetetramine.

9. The process according to claim 6 wherein the polyalkylenepolyamine is tetraethylenepentamine.

10. The process according to claim 8 wherein the salt is ammonium acetate.

11. The process according to claim 8 wherein the salt is sodium chloride.

References Cited in the file of this patent
UNITED STATES PATENTS

| | | |
|---|---|---|
| 1,951,994 | Rochet | Mar. 20, 1934 |
| 2,642,360 | Mackinney et al. | June 16, 1953 |
| 2,657,132 | Daniel et al. | Oct. 27, 1953 |